Figure 1:
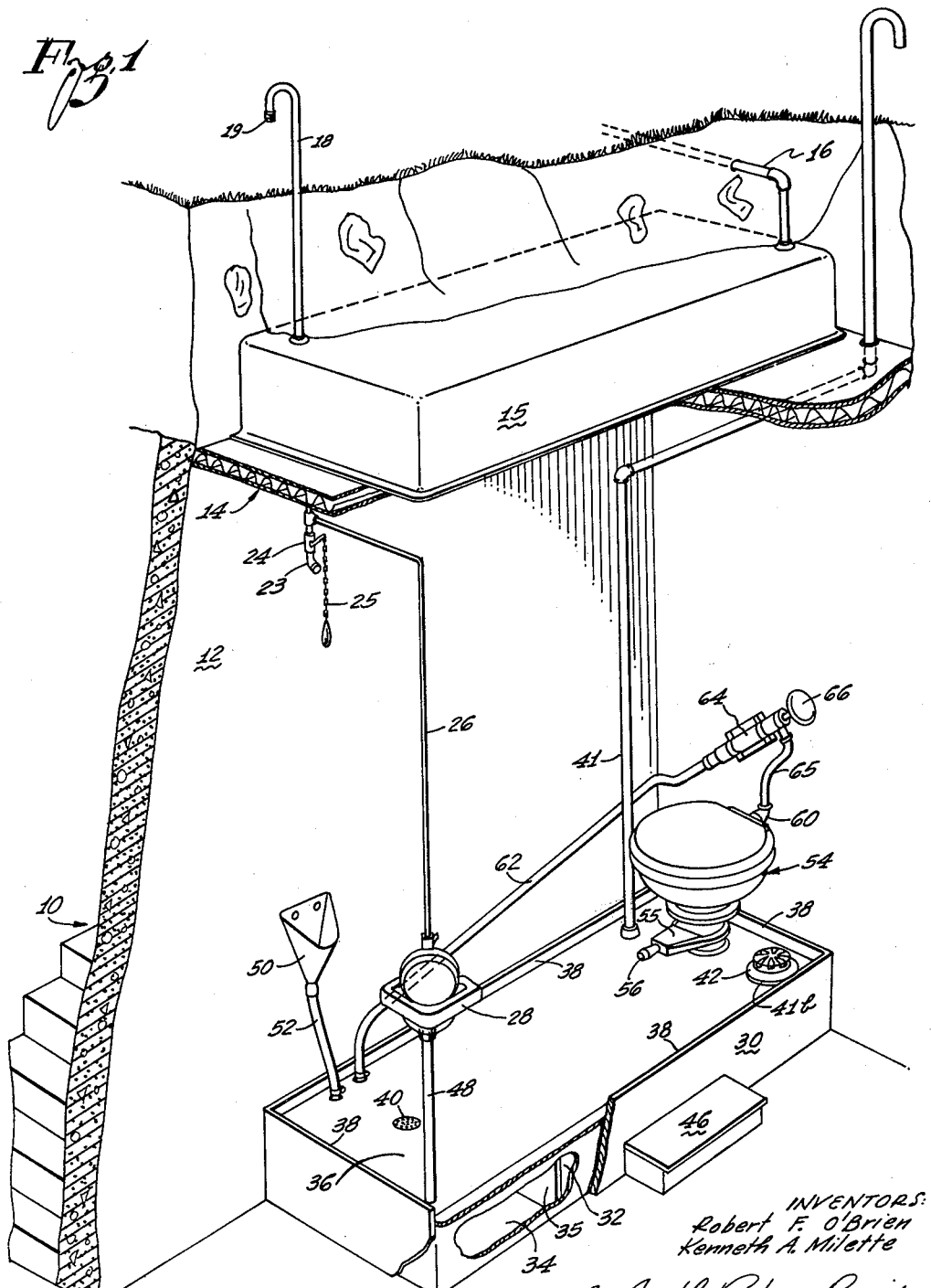

May 18, 1965 R. F. O'BRIEN ETAL 3,183,525
METHOD AND MEANS FOR OPERATING A TOILET IN A FALLOUT SHELTER
Filed Oct. 4, 1961 2 Sheets-Sheet 2

INVENTORS
Robert F. O'Brien
Kenneth A. Milette

Attorneys

United States Patent Office 3,183,525
Patented May 18, 1965

3,183,525
METHOD AND MEANS FOR OPERATING A TOILET IN A FALLOUT SHELTER
Robert F. O'Brien, Monterey Park, and Kenneth A. Milette, La Puente, Calif., assignors to Mission-West Manufacturing Company, Los Angeles, Calif., a corporation of Delaware
Filed Oct. 4, 1961, Ser. No. 142,923
13 Claims. (Cl. 4—1)

This invention relates to a toilet in a fallout shelter and, more particularly, is directed to the problem of operating such a toilet with minimum consumption of the limited available water.

Numerous water saving schemes for operating toilets in trailers and the like have been proposed heretofore, but the requirements for trailer use are simple in comparison to the requirements imposed by a fallout shelter. In the first place, it must be assumed that electricity is not available in a fallout shelter to operate the power pumps that are used in some trailer toilet systems.

In the second place, since the water supply of a trailer may be replenished frequently, extreme economy in water use is not necessary. In contrast, it may be necessary for five or more people to be confined in a fallout shelter for at least two weeks with no possibility of replenishing an initial water supply of 50 to 75 gallons.

In the third place, it is not necessary to minimize severely the accumulation of toilet sewage in a trailer since the accumulation may be discharged frequently and seldom need be contained for more than two or three days. A family fallout shelter is usually below the sewer level, however, and the expense of providing for sewage disposal for possible occupancy of the fallout shelter during an emergency period is not warranted.

Another distinction is in the fact that people are not continuously confined in a trailer and the trailer can be open most of the time for thorough airing. Since the accumulation of sewage odors is not a critical problem in a trailer, it may be feasible to adapt some expedient of recycling toilet sewage liquids for flushing a toilet bowl. A fallout shelter, however, must be completely closed off from the atmosphere except for filter ducts and any reuse of sewage liquids for toilet flushing would be intolerable.

An emergency period of several days in a fallout shelter starts with a supply of a given minimum quantity of water and a substantial proportion of this supply is consumed directly by the occupants. An additional quantity is required for washing operations and in some instances, for taking showers after exposure to fallout. Roughly, these two requirements just about use up the water supply by the end of the emergency period, leaving no water available for flushing a toilet.

The present invention meets these stringent requirements for life in a fallout shelter by salvaging waste water to the maximum and, at the same time, reducing to the minimum the amount of water required for toilet flushing. These two opposite aims are carried out to the extent of balancing the demand for flushing water with the supply of salvaged waste water.

For maximum accumulation of waste water, both a shower pan and a minimal wash basin drain into a waste water container. To augment the supply of waste water, a urinal also drains into the container and chemicals are added to deodorize and sterilize the contents of the container.

The requirement that only a minimum quantity of water be required for flushing the toilet bowl is met by providing a manually operable pump to deliver the waste water from the waste water container to the toilet bowl. The pump places the waste water under pressure to produce a highly effective high velocity jet of water, the high velocity stream being so effective that only one quart of water suffices. The hand pump delivers the required amount with three or four manual strokes. The toilet bowl flushes into a closed sewage tank and an easily operable gate valve normally cuts off the toilet bowl from the sewage receptacle to confine the sewage odors.

A feature of the preferred practice of the invention is that the toilet bowl, the sewage receptacle, the waste water container, the wash basin and the shower pan are all structurally integrated. The waste water container and the sewage receptacle are combined into one unitary structure and both have a common top wall, the top wall being a floor structure in the form of a shower pan that drains into the waste water container. The toilet bowl is mounted directly on this floor structure, which floor structure may be enclosed by a curtain, or other closure.

Figure 2:
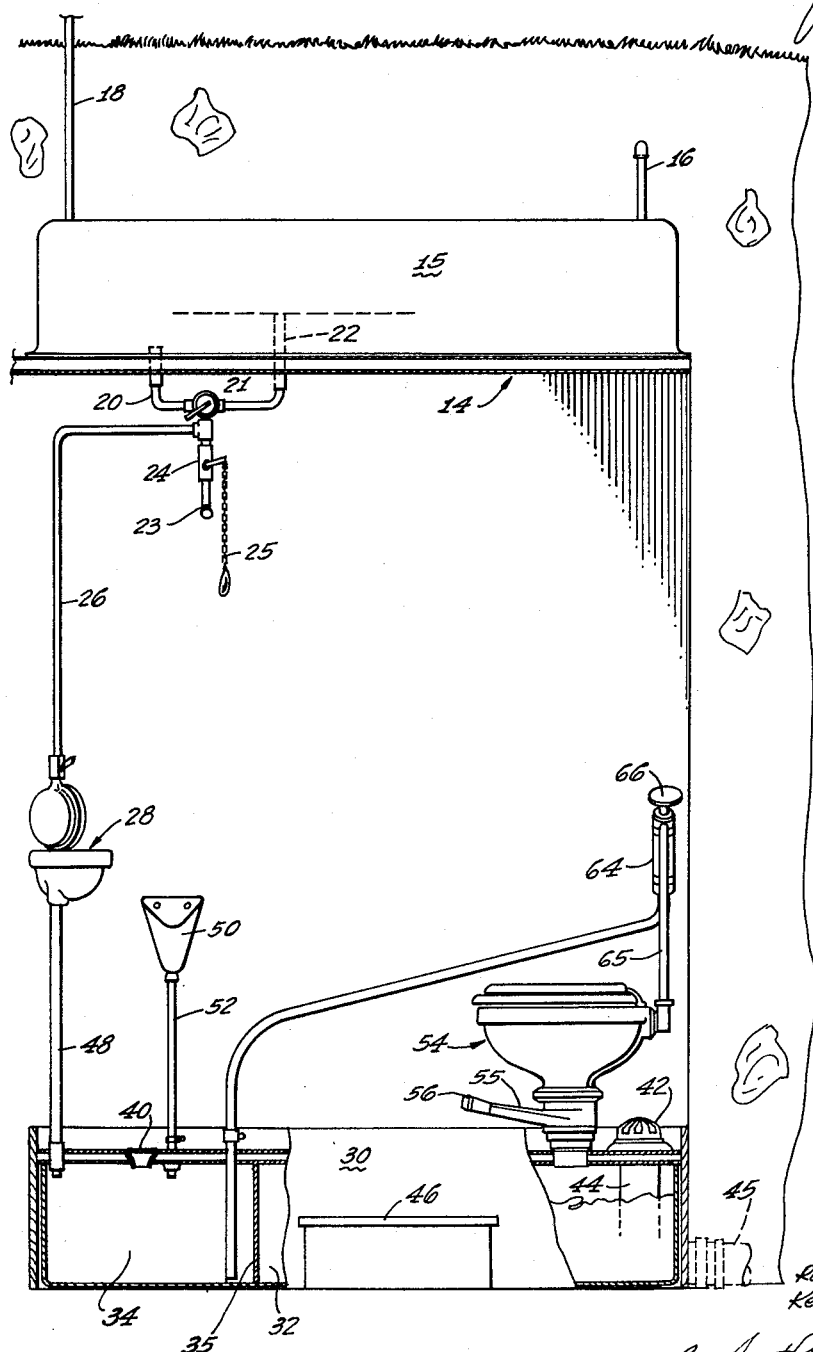

The features and advantages of the invention may be understood from the following detailed description and the accompanying drawings:

In the drawings, which are to be regarded as merely illustrative:

FIG. 1 is a perspective view of the presently preferred embodiment of the invention with portions broken away; and FIG. 2 is an end elevational view with portions broken away.

The drawings show the presently preferred embodiment of the invention installed in a typical fallout shelter having an entrance stairway 10, a concrete wall 12 adjacent the stairway to serve as a radiation shield, and a top wall 14 covered by a depth of soil. Mounted on the top wall 14 of the shelter, or in another proximate elevated but protected location, is a supply tank 15, which has a capacity adequate for the number of people that are to be housed in the fallout shelter. In the illustrated embodiment of the invention, for example, the portable water tank 15 may have a capacity of 75 gallons to supply the needs of five people over a period of two weeks. While the tank may be made of any suitable material, a construction is preferred in which the tank has a wall approximately ⅛" thick made of fiberglass cloth and polyester resin. The supply tank 15 is connected at one of its ends to the domestic water system by a supply pipe 16 and preferably is connected at its other end to an upwardly extending vent pipe 18 that is equipped above ground with a threaded coupling 19. The occasional use of the pipe 18 to water a lawn or flowers insures changing the water in the supply tank often enough to maintain a fresh supply for any emergency. Pipe 18 is left open to avoid placing the tank 15 under pressure when water is admitted through pipe 16 from the pressurized house line.

The supply tank 15 has a bottom outlet connected by a pipe 20 to one side of a three-way valve 21, and has an interior standpipe 22 connected to the other side of the three-way valve. The outlet port of the three-way valve 21 is connected to a shower head 23 through a shower valve 24 that is operated by a pull chain 25 and the outlet port is also connected by a pipe 26 to a faucet (not shown) of a wash basin 28. Initially the three-way valve 21 draws water from the standpipe 22 of the supply tank to make sure that the supply tank is not emptied prematurely or inadvertently. The wash basin 28 is of small size and is equipped with a relatively small faucet to encourage economy in the use of wash water.

A box-like structure 30 forms a sewage receptacle 32 and a waste water container 34 which are sealed off from each other by a transverse wall 35. For use with a 75 gallon supply tank 15, the waste water container 34 may have a capacity of 25 gallons and the capacity of the sewage receptacle 32 may be 50 gallons. The box-like structure 30 may be constructed of the same material as the supply tank 15. The top wall 36 of the box-like structure 30 serves as a shower pan to collect water that is dispensed by the shower head 24 and for this purpose the top wall 36 is surrounded by an upper flange 38. The shower pan has a drainage port 40 which is spanned by a removable perforated plate, and which is positioned to drain into the waste water container 34.

The sewage receptacle 32 is provided with a suitable up-right vent pipe 41 and is further provided with an access opening 41b that is normally closed by a cover 42. The vent pipe 41 preferably extends up to an above-ground outlet 41a with appropriate filtering (not shown). Preferably, the access opening 41b is provided with a large diameter pipe 44 that extends nearly to the bottom of the sewage receptacle. This access port may be used to remove the contents of the sewage receptacle after an emergency period. The sewage receptacle also has a lower port (not shown) which may be connected to a sewer pipe 45. The sewer pipe 45 may lead to a sewer connection or may lead to a leach line.

The box-like structure 30 may be positioned with the shower pan 36 substantially flush with the floor of the shelter. In the construction shown, however, the box-like structure rests on the floor of the shelter and a step 46 is positioned adjacent one side of the structure. The shower pan 36 may be surrounded by a partition or may be surrounded by a curtain or other closure.

In accord with the teachings of the invention, provision is made for waste water from the wash basin 26 to drain into the waste water container 34. For this purpose the wash basin 28 is mounted on a drain pipe 48 that extends upward from the shower pan 36. Also in accord with the invention, a urinal 50 is mounted on the shelter wall 12 and is provided with a plastic drain pipe 52 which enters the waste water container 34 through the shower pan 36.

A toilet bowl 54 is provided with its outlet connected to the sewage receptacle 32. In the present embodiment of the invention, the toilet bowl 54 is mounted on the shower pan 36. Thus, the sewage receptacle 32, the waste water container 34, the wash basin 28 and the toilet bowl 54 are all part of a single integral structure which may be moved bodily into the fallout shelter.

Because of the limited water supply, water cannot be used in the toilet bowl 54 in the customary manner to seal off the gases and odors in the sewage receptacle 32. To serve the same purpose, the toilet bowl outlet is provided with an easily operable gate valve 55, which is opened and closed by means of a handle 56.

The toilet bowl 54 is provided with a rearward inlet pipe 60 to receive waste water for flushing the toilet bowl. In the construction shown, an inclined plastic hose 62 leads from the bottom region of the waste water container 34 to an upper level near the toilet bowl where the pipe is connected to the intake portion of a manually operable brass pump 64 that is mounted on the shelter wall. The discharge port of the pump is connected to the inlet pipe 60 of the toilet bowl by a pipe 65. The pump 64 is a double acting pump of the reciprocating type which is manually operated by means of a handle 66.

The manner in which the invention serves its purpose may be readily understood from the foregoing description. An emergency period in which five people are to remain in the fallout shelter begins with the supply tank 15 full of fresh water and with the supply tank cut off from the domestic source to make sure that no contaminated water enters the shelter. The occupants exercise restraint in using the wash basin, and, of course, the shower would be used only in the event that one of the occupants is exposed to fallout.

At the start of the emergency, both the sewage receptacle 32 and the waste water container 34 are empty. Waste water and urine accumulate in the waste water container 34, and a suitable deodorant as well as a suitable sterilizing material may be introduced through the drainage port 40 to make the waste water mixture free of odor and sanitary. If desired, these additives may be placed in the waste water container 34 in advance in preparation for an emergency. The additives may be provided in a water soluble container or may be imbedded in water soluble material for progressive release over the time period of an emergency. The preferred such sterilizing and deodorizing additive is a compound sold by Rhodia, Inc. of New York city, New York, under the trademark Flushex. This composition is advertized to contain the following active ingredients:

| | Percent |
|---|---|
| Formaldehyde | 1.09 |
| Alkyl-trimethyl-ammonium-chloride | .78 |
| 1-(2-hydroxethyl)-2-N-alkyl-1-bonzyl-2-1 midazolinium chloride | .78 | the balance being inert ingredients. This composition emits a pleasant aroma and includes effective wetting agents.

When it is necessary to flush the toilet bowl 54, the handle 56 is manipulated to open the gate valve 55 momentarily, and then the pump handle 66 is reciprocated three or four times to draw approximately a quart of the treated waste water mixture from the container 34 and to discharge the water into the inlet pipe 60 of the toilet bowl. The pump places the waste water mixture under high pressure to create a high velocity water jet inside the bowl that is effective for its purpose. The gate valve 55 is closed immediately after the flushing operation.

Because such a small amount of water is required to flush the toilet bowl by virtue of the efficiency of the hand pump 64, the normal amount of wash water and urine supplied to the container 34 is adequate for the flushing operations required during the emergency period.

Our description and specific detail of the selected embodiment of the invention will suggest various changes, substitutions and other departures from our disclosure within the spirit and scope of the appended claims.

We claim:
1. In a fallout shelter or the like, having a reservoir containing potable fresh water, at least one outlet to dispense the water, a toilet bowl, and a closed sewage receptacle connected to the toilet bowl outlet, means to flush the toilet bowl with low consumption of the fresh water, comprising:
   (a) a waste container completely isolated from the sewage receptacle;
   (b) means to drain the excess dispensed water into said container; and
   (c) means to withdraw water from the waste container for flushing the toilet bowl,
   (d) said withdrawing means including a manually operable pump to inject the water into the toilet bowl under pressure to minimize the quantity of water required for the flushing operation.

2. A combination as set forth in claim 1, which includes:
   (e) a manually operable valve to cut off the sewage receptacle from the toilet bowl.

3. A combination as set forth in claim 1, in which:
   (e) said receptacle has at least one port adapted to receive additives such as deodorizers and sterilizers.

4. A combination as set forth in claim 3, which includes:
   (f) a urinal connected to drain into said waste container.

5. A combination as set forth in claim 1, in which:
   (e) the capacity of said sewage receptacle is on the order of twice the capacity of the waste water container.

6. A combination as set forth in claim 5, in which:
   (f) the combined capacity of the waste water container and the sewage receptacle is approximately the capacity of the fresh water reservoir.

7. In a fallout shelter or the like, having a reservoir containing fresh water, at least one outlet to dispense the water, a toilet bowl, and a closed sewage receptacle connected to the toilet bowl outlet, means to flush the toilet bowl with low consumption of the fresh water, comprising:

(a) a waste container completely isolated from the sewage receptacle;
(b) means to drain the excess dispensed water into said container;
(c) means to withdraw water from the waste container for flushing the toilet bowl,
(d) said withdrawing means including a manually operable pump to inject the water into the toilet bowl under pressure to minimize the quantity of water required for the flushing operation;
(e) a manually operable valve to cut off the sewage receptacle from the toilet bowl; and
(f) a urinal connected to drain into said waste container.

8. In a fallout shelter or the like, having a fresh water supply, an outlet to dispense water from the supply, a shower head connected to said supply and a toilet bowl, means cooperative with the toilet bowl for operation thereof, comprising:

(a) a sewage receptacle connected to the outlet of said toilet;
(b) a waste water container sealed off from said receptacle;
(c) a floor structure serving as the top wall of both said receptacle and said container;
(d) said floor structure being in the form of a shower pan for use under said shower head, said shower pan draining into said container; and
(e) means to withdraw water from the waste container for flushing the toilet bowl,
(f) said withdrawing means including a manually operable pump to inject the water into the toilet bowl under pressure to minimize the quantity of water required for the flushing operation.

9. A combination as set forth in claim 8 in which:
(g) said toilet bowl is mounted on said floor structure and is thereby united with said receptacle and said container.

10. A combination as set forth in claim 8, which includes:
(g) a manually operable valve to cut off the sewage receptacle from the toilet bowl.

11. A combination as set forth in claim 8, which includes:
(g) a urinal connected to said waste container.

12. A combination as set forth in claim 8, which includes:
(g) a wash basin positioned under said outlet and draining into said container.

13. In a fallout shelter or the like, having a fresh water supply, an outlet to dispense water from the supply, a shower head connected to said supply and a toilet bowl, means cooperative with the toilet bowl for operation thereof, comprising:

(a) a sewage receptacle connected to the outlet of said toilet;
(b) a waste water container sealed off from said receptacle;
(c) a floor structure serving as the top wall of both said receptacle and said container;
(d) said floor structure being in the form of a shower pan for use under said shower head, said shower pan draining into said container;
(e) means to withdraw water from the waste container for flushing the toilet bowl,
(f) said withdrawing means including a manually operable pump to inject the water into the toilet bowl under pressure to minimize the quantity of water required for the flushing operation;
(g) a manually operable valve to cut off the sewage receptacle from the toilet bowl;
(h) a urinal connected to drain into said container; and
(i) means positioned under said outlet and draining into said container.

References Cited by the Examiner
UNITED STATES PATENTS

| 33,494 | 10/61 | Robertson | 4—78 |
| 187,545 | 2/77 | McEwan | 4—198 |
| 302,351 | 7/84 | Nash | 4—78 |
| 2,946,065 | 7/60 | Smith | 4—115 |
| 3,005,205 | 10/61 | Breen | 4—115 |
| 3,005,993 | 10/61 | Corliss | 4—115 |

FOREIGN PATENTS 689,050   3/53   Great Britain.

EDWARD V. BENHAM, *Primary Examiner.*

FRANK E. BAILEY, FRANK H. BRONAUGH, *Examiners.*